(12) United States Patent
Rafferty

(10) Patent No.: US 11,347,204 B2
(45) Date of Patent: May 31, 2022

(54) ADJUSTABLE FLUIDIC OSCILLATORS

(71) Applicant: The Boeing Company, Chicago, IL (US)

(72) Inventor: Bradley Jerome Rafferty, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 382 days.

(21) Appl. No.: 16/747,258

(22) Filed: Jan. 20, 2020

(65) Prior Publication Data

US 2021/0223758 A1 Jul. 22, 2021

(51) Int. Cl.
| | |
|---|---|
| *F15C 1/22* | (2006.01) |
| *G05B 19/416* | (2006.01) |
| *F16K 99/00* | (2006.01) |
| *B64B 1/00* | (2006.01) |
| *G05D 7/06* | (2006.01) |
| *G05B 13/00* | (2006.01) |
| *F15D 1/12* | (2006.01) |
| *F15C 3/16* | (2006.01) |
| *B05B 1/08* | (2006.01) |
| *G05D 16/10* | (2006.01) |

(52) U.S. Cl.
CPC .............. *G05B 19/416* (2013.01); *B05B 1/08* (2013.01); *B64B 1/00* (2013.01); *F15C 1/22* (2013.01); *F15C 3/16* (2013.01); *F15D 1/12* (2013.01); *F16K 99/00* (2013.01); *G05B 13/00* (2013.01); *G05D 7/0635* (2013.01); *G05D 16/103* (2013.01); *G05B 2219/41301* (2013.01)

(58) Field of Classification Search
CPC ................. G05B 19/416; G05B 13/00; G05B 2219/41301; B05B 1/08; B64B 1/00; F15C 1/22; F15C 3/16; F15D 1/12; F16K 99/00; G05D 7/0635; G05D 16/103
USPC ..... 137/835, 833, 839, 834, 841, 842, 487.5
See application file for complete search history.

(56) References Cited

U.S. PATENT DOCUMENTS

| | | | | |
|---|---|---|---|---|
| 3,376,881 | A * | 4/1968 | Godwin | ..................... F15C 1/04 137/834 |
| 3,465,773 | A * | 9/1969 | Ahern | ........................ F15C 1/10 137/839 |
| 6,253,782 | B1 | 7/2001 | Raghu | |
| 7,128,082 | B1 * | 10/2006 | Cerretelli | .............. B05B 7/0075 137/833 |
| 8,844,571 | B2 * | 9/2014 | Golling | ................. B64C 21/025 239/592 |
| 9,120,563 | B2 * | 9/2015 | Raghu | ....................... F17D 1/02 |

(Continued)

OTHER PUBLICATIONS

"Lagrangian Coherent Structures in the Flow Field of a Fluidic Oscillator," APS Physics, Accessed Jan. 21, 2020, Retrieved from the Internet: <URL: https://www.youtube.com/watch?v=TgYJ1Ni08UA> 5 pages.

(Continued)

*Primary Examiner* — Minh Q Le
(74) *Attorney, Agent, or Firm* — Hanley, Flight & Zimmerman, LLC

(57) ABSTRACT

Adjustable fluidic oscillators are disclosed. A disclosed example oscillator includes a base having a cavity with a cross-sectional profile defining an oscillatory chamber between an inlet and an outlet of the oscillator, and a plunger to be received by the cavity and movable along a depth of the cavity to vary an aspect ratio of the oscillator.

20 Claims, 10 Drawing Sheets

(56) References Cited

U.S. PATENT DOCUMENTS

| | | | | |
|---|---|---|---|---|
| 10,563,776 B1* | 2/2020 | Lindsay | ................. | G06F 3/0346 |
| 2006/0219847 A1* | 10/2006 | Miller | ..................... | B64C 23/00 |
| | | | | 244/130 |
| 2006/0273197 A1* | 12/2006 | Saddoughi | ................ | F15D 1/12 |
| | | | | 239/265.17 |
| 2010/0229952 A1* | 9/2010 | Smith | ..................... | B64C 21/08 |
| | | | | 137/1 |
| 2011/0005334 A1* | 1/2011 | Haynes | ................... | F23N 5/242 |
| | | | | 73/861.19 |
| 2013/0284294 A1* | 10/2013 | Golling | .................. | B64C 21/04 |
| | | | | 137/833 |
| 2013/0291981 A1* | 11/2013 | Lengers | .................. | F15B 21/12 |
| | | | | 137/825 |
| 2015/0238982 A1* | 8/2015 | Koklu | ...................... | B05B 1/08 |
| | | | | 239/589.1 |
| 2017/0297680 A1* | 10/2017 | Shmilovich | ........... | F15B 21/042 |
| 2018/0161786 A1* | 6/2018 | Bobusch | ................... | B05B 1/08 |
| 2019/0145441 A1* | 5/2019 | Tomac | ..................... | B05B 1/08 |
| | | | | 137/826 |
| 2020/0017199 A1* | 1/2020 | Leung | ..................... | F15D 1/002 |
| 2020/0306771 A1* | 10/2020 | Tomac | ..................... | F15C 1/22 |
| 2021/0362840 A1* | 11/2021 | Rafferty | ................ | H02P 29/024 |

OTHER PUBLICATIONS

Zemtseff, Katherine and Jensen, Bret, "Smaller Tails, Big Breakthrough," Boeing, May 15, 2015, Retrieved from the Internet: <URL: http://www.boeing.com/features/2015/05/bca-active-flow-control.page> 5 pages.

* cited by examiner

ADJUSTABLE FLUIDIC OSCILLATORS

FIELD OF THE DISCLOSURE

This disclosure relates generally to oscillatory fluid generation and, more particularly, to adjustable fluidic oscillators.

BACKGROUND

Fluidic oscillator systems or fluidic oscillator arrays are typically composed of at least one fluid oscillator to generate sweeping fluid jets. In particular, an individual fluid oscillator (i.e., a fluidic oscillator) includes an inlet and an outlet with a cavity defining an oscillatory chamber positioned therebetween. Fluid enters the inlet and exits the fluid oscillator at the outlet as a sweeping fluid jet that cyclically changes direction with a corresponding period. In particular, the sweeping fluid jet is generated by the fluid flowing through the oscillatory chamber.

SUMMARY

An example oscillator includes a base having a cavity with a cross-sectional profile defining an oscillatory chamber between an inlet and an outlet of the oscillator, and a plunger to be received by the cavity and movable along a depth of the cavity to vary an aspect ratio of the oscillator.

An example oscillator base includes a body extending along a longitudinal axis of the oscillator base, where the body includes opposing front and rear surfaces arranged across the longitudinal axis, and where the body includes upper and lower surfaces extending between the front and rear surfaces, and a cavity with a cross-sectional profile at least partially defining an oscillatory chamber, where the cavity includes an inlet at the lower surface, and where the cavity is to receive a plunger to vary an aspect ratio of an oscillator associated with the oscillator base.

An example method of varying an aspect ratio of an oscillator includes providing fluid to an inlet of a body of the oscillator, the fluid to exit the body at an outlet of the body as a sweeping fluid jet, and moving a plunger relative to a cavity of the body to vary the aspect ratio, where the cavity defines an oscillatory chamber, and providing fluid to an inlet of the body, where the fluid is to exit the body at an outlet of the body as a sweeping fluid jet.

An example non-transitory machine readable medium includes instructions, which when executed, cause a processor to at least determine a desired fluid property of a fluid jet exiting an outlet of a body of an oscillator, calculate, based on the desired fluid property, an adjustment of a plunger, and move the plunger relative to a depth of a cavity of the body to vary an aspect ratio of the oscillator.

Figure 1:
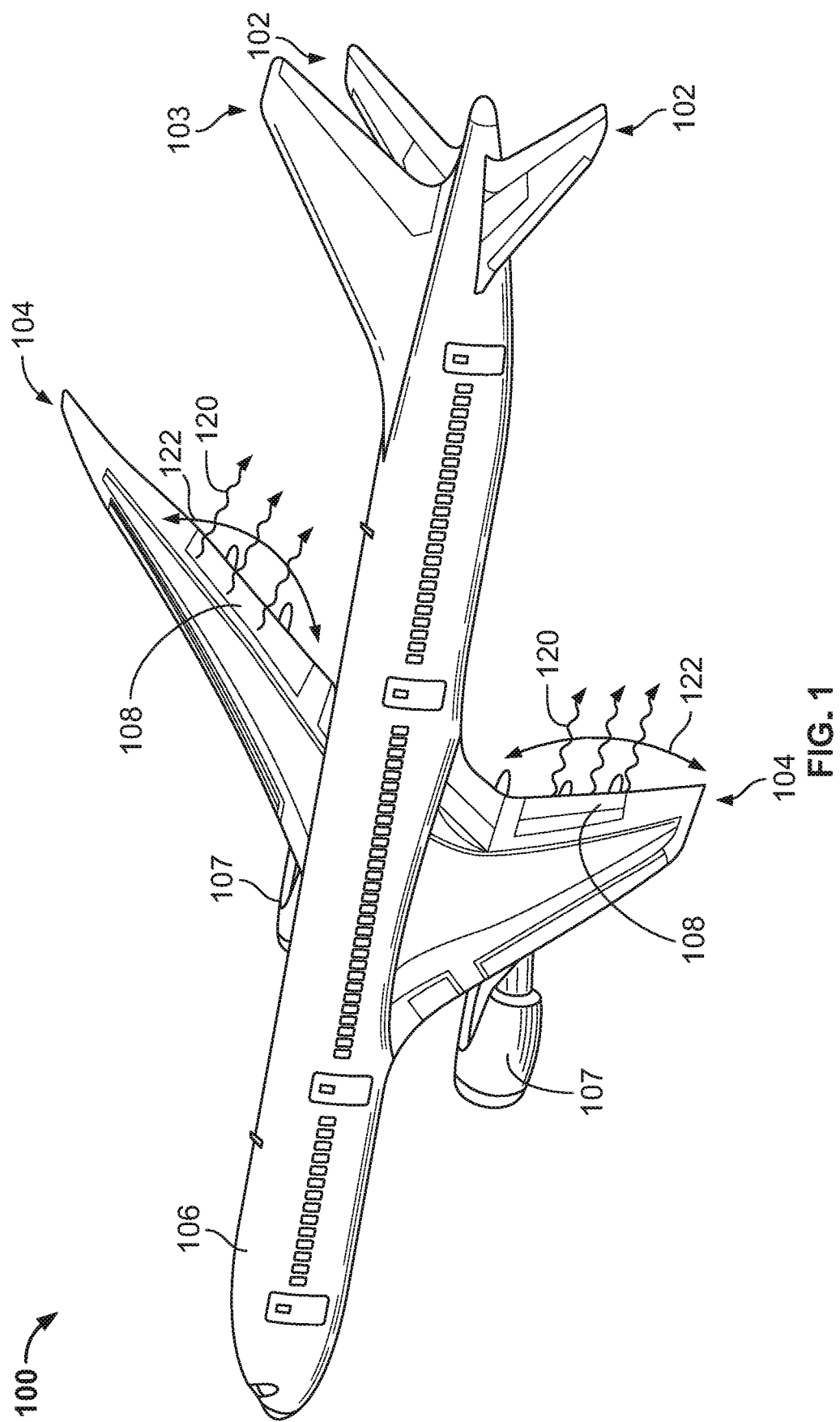
FIG. 1 illustrates an example aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Adjustable fluidic oscillators are disclosed. Some known fluid oscillator systems employ fluid oscillators to generate sweeping fluid jets. These fluid oscillators usually include a body with a cavity that defines an oscillatory chamber between an inlet and an outlet. During operation, fluid flows from the inlet, through the oscillatory chamber and exits the outlet as a fluid jet that moves in a sweeping oscillatory motion. Parameters of these fluid oscillators, however, are not generally adjustable because the cavities are fixed. In particular, the oscillatory chambers of the fluid oscillators have fixed geometries and/or shapes and fluid flow adjustment provides some degree of control, but adjustment thereof can adversely affect other functional and/or operational needs.

Examples disclosed herein enable highly adjustable use of fluid oscillators. Examples disclosed herein implement a movable plunger to affect an aspect ratio of a fluidic oscillator and, thus, flow properties of fluid exiting the oscillator. The plunger is to be received by a cavity of a body (e.g., a block). The cavity is fluidly coupled to an inlet and outlet of the body, and defines a cross-sectional profile with an oscillatory chamber. In operation, the plunger is moved along a depth of the cavity to vary properties, such as a period, an angular displacement, a spread angle and/or a pressure of a sweeping fluid jet exiting from the aforementioned outlet.

As used herein, the term "oscillator" refers to a sweeping fluid jet flow oscillator that generates and/or augments a fluid jet that moves in a sweeping direction (e.g., a laterally sweeping direction, a flow that changes orientation between angular extremes, a periodic angular range with a characteristic period). As used herein, the term "complementarily shaped" refers to an object or component having a surface, contour and/or geometry that is relatively close to that of another object or component (e.g., for interfacing purposes, fit purposes, etc.). As used herein, the term "body" refers to a component, material and/or portion of an object on which oscillator features are defined thereon and/or within. Accordingly, a pattern or array of oscillators can be defined thereon.

FIG. 1 illustrates an example aircraft 100 in which examples disclosed herein can be implemented. In the illustrated example, the aircraft 100 includes horizontal tails 102, a vertical tail 103 and wings (e.g., fixed wings) 104 attached to a fuselage 106. The wings 104 of the illustrated example have engines 107, and control surfaces (e.g., flaps, ailerons, tabs, etc.) 108, some of which are located at a trailing edge or a leading edge of the wings 104. The control surfaces 108 may be displaced or adjusted (e.g., deflected, etc.) to provide lift during takeoff, landing and/or flight maneuvers.

To control flight of the aircraft 100, the control surfaces 108 mounted to the wings 104 alter the lift and pitch of the aircraft 100. According to examples disclosed herein, during flight of the aircraft 100 and/or movement of the control surfaces 108, sweep jets 120 can be emitted from the wings 104. In particular, the sweep jets 120 can oscillate along directions generally indicated by double arrows 122 to affect aerodynamic properties of the aircraft 100 (e.g., reducing a drag coefficient of the aircraft 100). However, examples disclosed herein can be applied to any other appropriate vehicle, body and/or application including, but not limited to, mixing (e.g., fuel mixing, combustion mixing, a fire extinguisher, etc.), cooling, heat transfer, fluid distribution, flow control, a heat exchanger, etc.

Figure 2A:
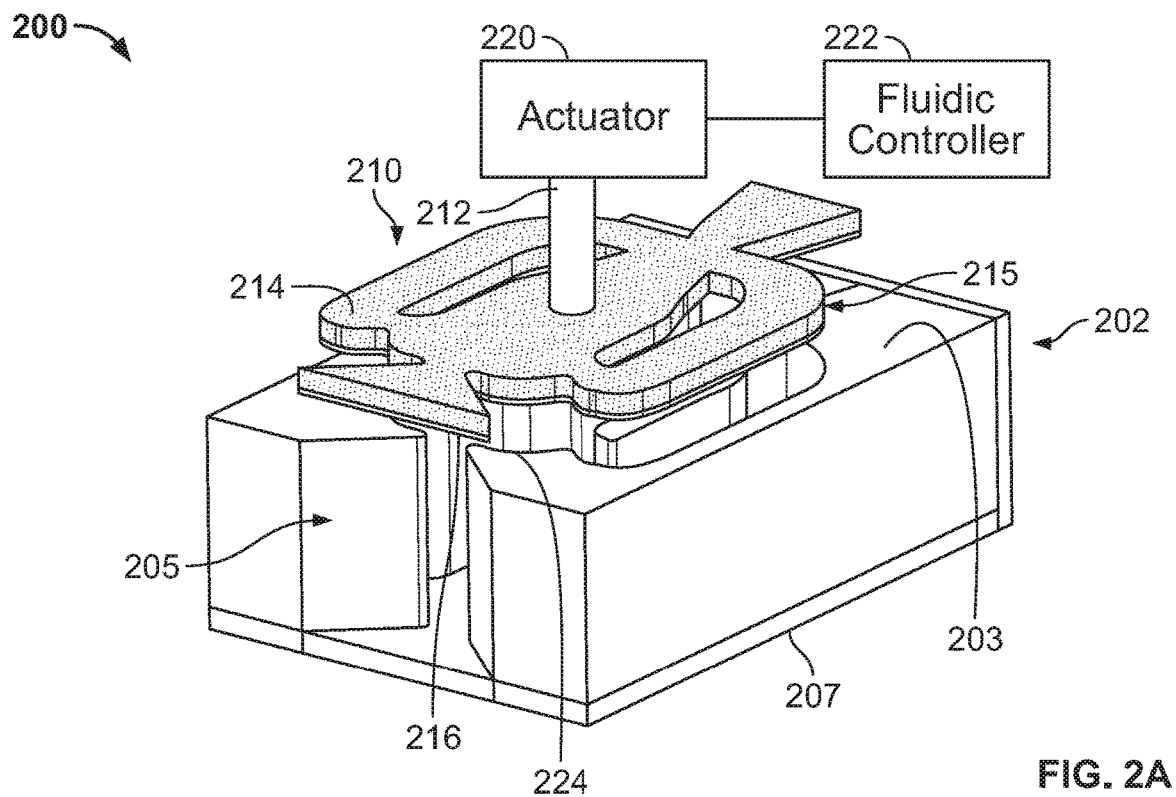
FIGS. 2A and 2B are isometric views of an example oscillator in accordance with teachings of this disclosure.
Figure 2B:
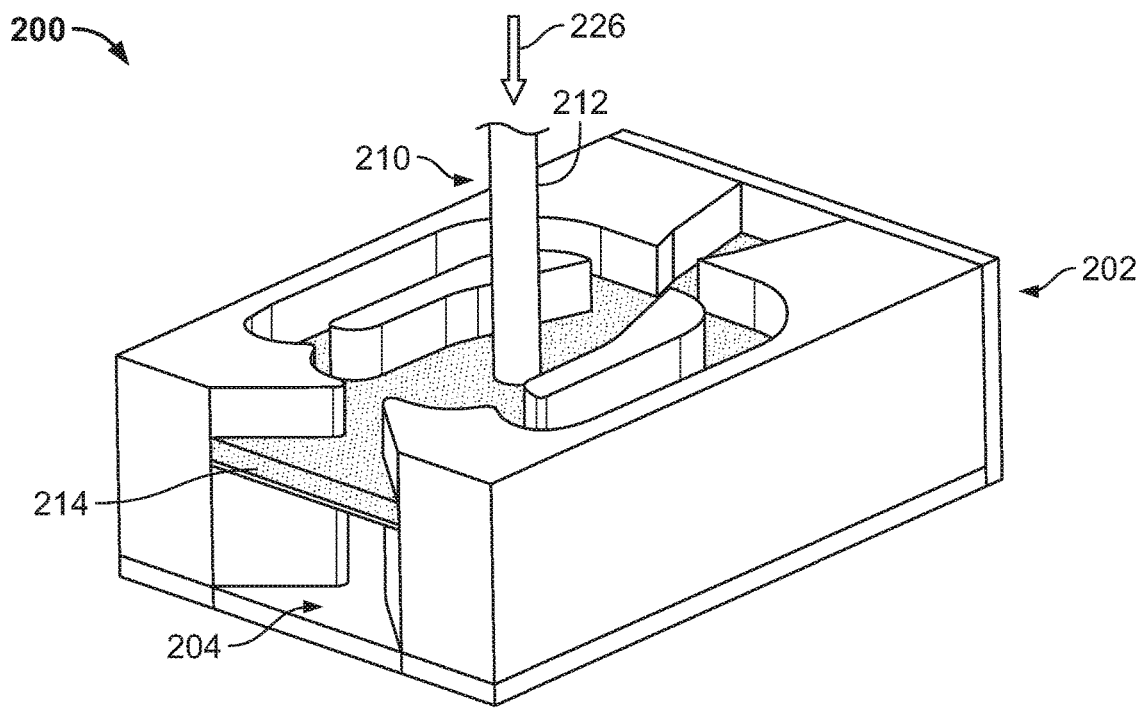

FIGS. 2A and 2B are isometric views of an example oscillator 200 in accordance with teachings of this disclosure. Turning to FIG. 2A, the oscillator 200 of the illustrated example includes a body (e.g., a block, a discrete body, a body of a base, etc.) 202 having a cavity 204, which defines a cross-sectional profile 205. The example body 202 also includes upper and lower surfaces 203, 207, respectively. In the illustrated example, the oscillator 200 further includes a plunger 210 which, in turn, includes a stem 212 and a plunger wall 214 with a shaped geometric profile 215. The example plunger wall 214 is coupled to a distal end of the stem 212. In some examples, the plunger wall 214 includes a seal (e.g., a gasket seal, a circumferential seal, an O-ring seal, a ring seal, a flap seal, a wall seal, an edge seal, etc.) 216. In some examples, the oscillator 200 includes an actuator (e.g., a linear actuator) 220 and a fluidic controller 222.

To generate an oscillatory sweeping fluid jet from fluid entering the cavity 204, the cross-sectional profile 205 defines an oscillatory chamber (e.g., an oscillatory plenum) 224. As a result of the fluid interacting with the oscillatory chamber 224, the fluid exits the body 202 as an oscillating and/or sweeping fluid jet, which can have associated parameters (e.g., desired operational parameters). The parameters may include, but are not limited to, flow pressure, an oscillatory period, a sweep angle, a flow width, etc. Accordingly, these parameters can be varied based on movement of the plunger 210 along a depth of the cavity 204. In this example, the geometric profile 215 of the plunger wall 214 is complementarily shaped to the cross-sectional profile 205 of the cavity 204 to define a relatively sealed interface between the plunger wall 214 and the cavity 204 as the plunger wall 214 is moved relative to the cavity 204.

To vary an aspect ratio of the fluid oscillator 200, the plunger 210 is moved relative to the body 202 along a depth of the cavity 204. In particular, the stem 212 and the plunger wall 214 are caused to move, thereby affecting a position of the plunger wall 214 relative to internal walls of the cavity 204. The plunger wall 214 defines a relatively sealed interface with the cavity 204 (e.g., based on tolerancing and/or relatively tight part fit) and, thus, the movement of the plunger wall 214 varies an effective depth of the cavity 204. Additionally or alternatively, the aforementioned seal 216 is implemented on the plunger wall 214 (e.g., a portion of the plunger wall 214, an entire outer surface or edge of the plunger wall 214) and/or surfaces of the cavity 204 to sealingly engage the cavity 204, thereby defining a sealed interface between the plunger wall 214 and the cavity 204 and/or the body 202.

To direct movement of the actuator 220 and, thus, the plunger 210, the fluidic controller 222 causes the actuator 220 to linearly displace the stem 212 relative to the cavity 204. As will be discussed in greater detail below in connection with FIG. 6, the plunger 210 may be displaced based on sensor data (e.g., flow sensor data, data measured by a sensor) and/or a desired sweeping flow characteristic (e.g., a flow jet sweep period, a flow jet angular displacement range, a flow jet width, etc.).

While the example body 202 of FIG. 2A is depicted as generally block-shaped in this example, the cavity 204 can be implemented into and/or onto any other type of body, device, component and/or material (e.g., a wall, a shaped or contoured portion of material, a discontinuous block, etc.). In some examples, at least one of the body 202 or the plunger 210 is at least partially composed of silicon and/or a resistance temperature detector (RTD) material. In some examples, the seal 216 is implemented as a separate component (e.g., an assembled and/or placed component) from the plunger 210 and the body 202.

In some examples, the oscillator 200 is implemented as part of an array of oscillators. In other words, multiple ones of the oscillator 200 may be operated in the array. In some such examples, movement of the plungers 210 between multiple respective ones of the oscillator 200 is coordinated (e.g., the oscillators 200 are moved together). For example, one of the plungers 210 may be used for multiple ones of the oscillators 200. Additionally or alternatively, at least one of the plungers 210 of the oscillators 200 is moved to a different height from other ones of the array (e.g., to affect an overall fluid flow). In some examples, the oscillators 200 can be provided with a common fluid supply (e.g., a common air supply).

The example oscillator 200 can be used to control a jet spread angle. In particular, a common performance parameter by which flow control systems are defined is a momentum coefficient, which corresponds to an amount of momentum added relative to a momentum of a free stream flow. Typically, higher momentum coefficients lead to higher efficacy of flow control. For example, two parameters to control the momentum coefficient are an area of an outlet jet of fluid and a jet velocity (e.g., a mass flow rate). For conventional fluidic oscillators, a momentum coefficient is varied by changing a velocity of its outlet jet (i.e., varying the mass flow rate supplied to the oscillator). As a result, the jet spread angle will change as the mass flow rate through the oscillator changes, and, thus, the jet spread angle is dependent on the momentum coefficient. In contrast, one advantage (of many) of examples disclosed herein in regard to flow control applications is that the momentum coefficient and the jet spread angle can be controlled independently, as generally indicated by Equation 1 below, which can be implemented to determine a momentum coefficient:

$$\overrightarrow{C_\mu(t)} = \frac{\overrightarrow{J(t)}}{\frac{1}{2}\rho_{ref}A_{ref}U_{ref}^2}, \tag{1}$$

where J(t) is a time-dependent momentum flux of the jet, where A is the area, where ρ is the density, and U is the velocity.

Turning to FIG. 2B, the oscillator 200 is shown with the plunger 210 displaced relative to the position shown in FIG. 2A. In particular, the stem 212 and the plunger wall 214 have been moved further into a depth of the cavity 204, along a direction generally indicated by an arrow 226. As a result, an aspect ratio of the oscillator 200 has, thus, been varied, thereby affecting flow properties of a resultant sweeping fluid jet exiting the oscillator 200.

Figure 3:
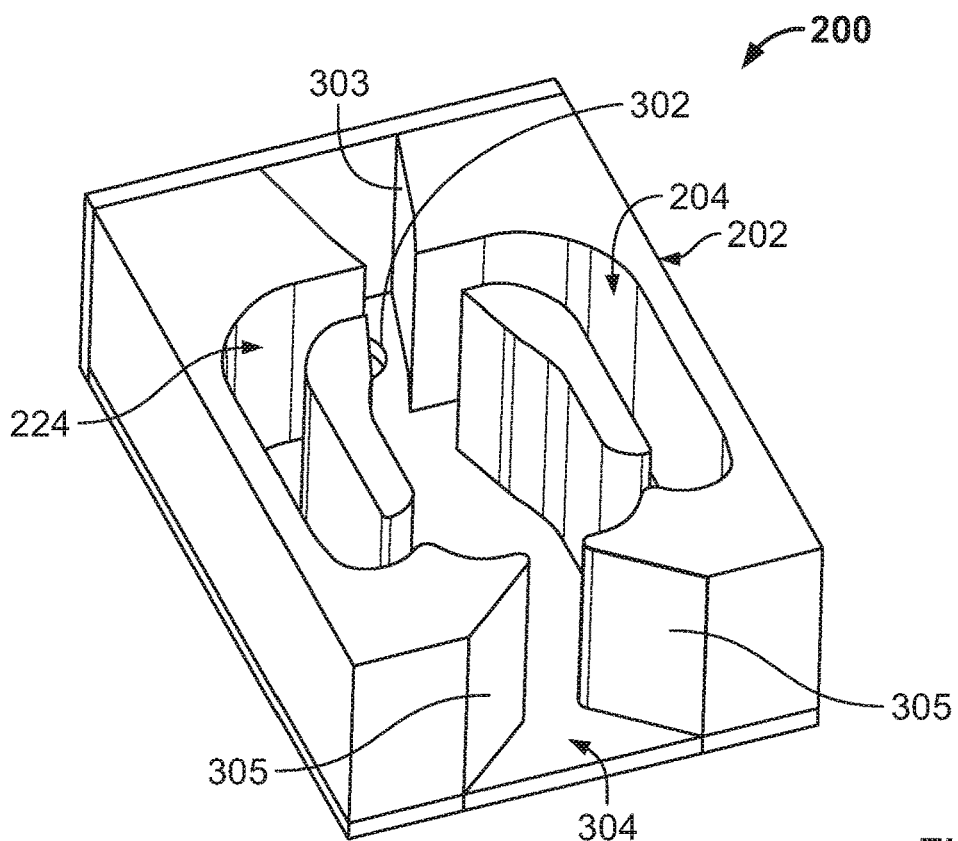
FIG. 3 is a detailed isometric view of a body of the example oscillator of FIGS. 2A and 2B.

FIG. 3 is a detailed isometric view of the body 202 of the example oscillator 200 of FIGS. 2A and 2B. In the illustrated view of FIG. 3, the aforementioned cavity 204 is shown without the plunger wall 214 for clarity. In this example, an inlet (e.g., a circular opening) 302 is positioned near a converging throat 303 and on an opposite side from an outlet 304, which is implemented as a diverging outlet (e.g., a diverging throat outlet) defined by angled walls 305. Further, the oscillatory chamber 224 is positioned and/or located between the inlet 302 and the outlet 304.

While the inlet 302 is shown in this example as generally circular or ellipsoid in shape, the inlet 302 may have any other appropriate geometry (e.g., rectangular, ellipsoid, triangular, hexagonal, etc.) In some other examples, the inlet 302 is located on the plunger 210 (e.g., as an opening on the plunger wall 214 of the plunger 210) instead. In such examples, at least a portion of a fluid source (e.g., a tube of the fluid source) moves along with the plunger 210 and fluid is provided from the inlet 302 to pass through an opening of the plunger wall 214 and, subsequently, enter the cavity 204. In yet other examples, the inlet 302 is defined on a wall of the cavity 204 and/or the converging throat 303 (e.g., at a depth of the cavity 204 that the plunger 210 does not contact). In some examples, the plunger 210 only changes an aspect ratio of a portion or section of the cross-sectional profile 205 of FIG. 2A and/or the cavity 204.

Figure 4:
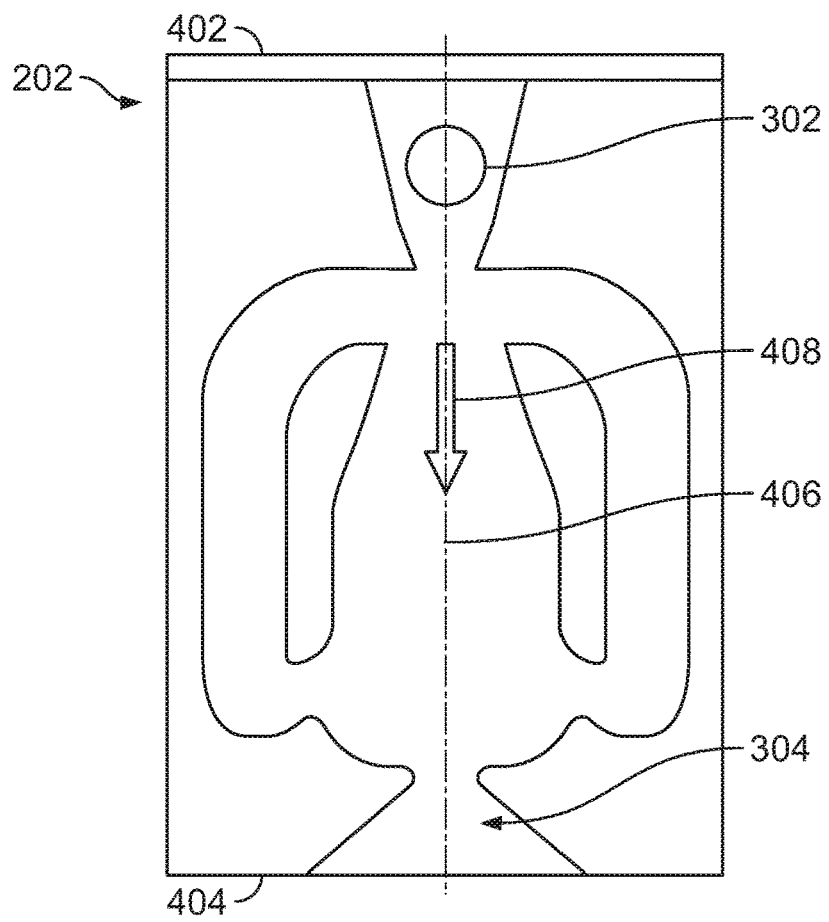
FIG. 4 is a top view of the body shown in FIGS. 2A-3.

FIG. 4 is a top view of the example body 202 shown in FIGS. 2A-3. In the illustrated example, the inlet 302 is shown proximate a front side or surface 402 of the body 202 while the outlet 304 is shown proximate a rear side or surface 404 of the body 202. In this example, the body 202 has a corresponding longitudinal axis 406. Further, a general shape of the oscillatory chamber 224 is shown in FIG. 4. However, any appropriate oscillatory chamber shape, geometry and/or contour can be implemented instead.

In operation, fluid enters the inlet 302 and moves along a direction of the longitudinal axis 406, as generally indicated by an arrow 408. The flow of the fluid into the oscillatory chamber 224 causes a sweeping movement of the fluid exiting the outlet 304. Because the fluid enters the inlet 302 perpendicular to the page (in the view of FIG. 4), movement of the plunger 210 (not shown) into/out of the page does not generally affect an amount of fluid flowing into the oscillatory chamber 224. In other words, the example placement of the inlet 302 enables adjustability of exiting fluid characteristics of the example oscillator 200 without adverse and/or unintended fluid flow effects.

Figure 5:
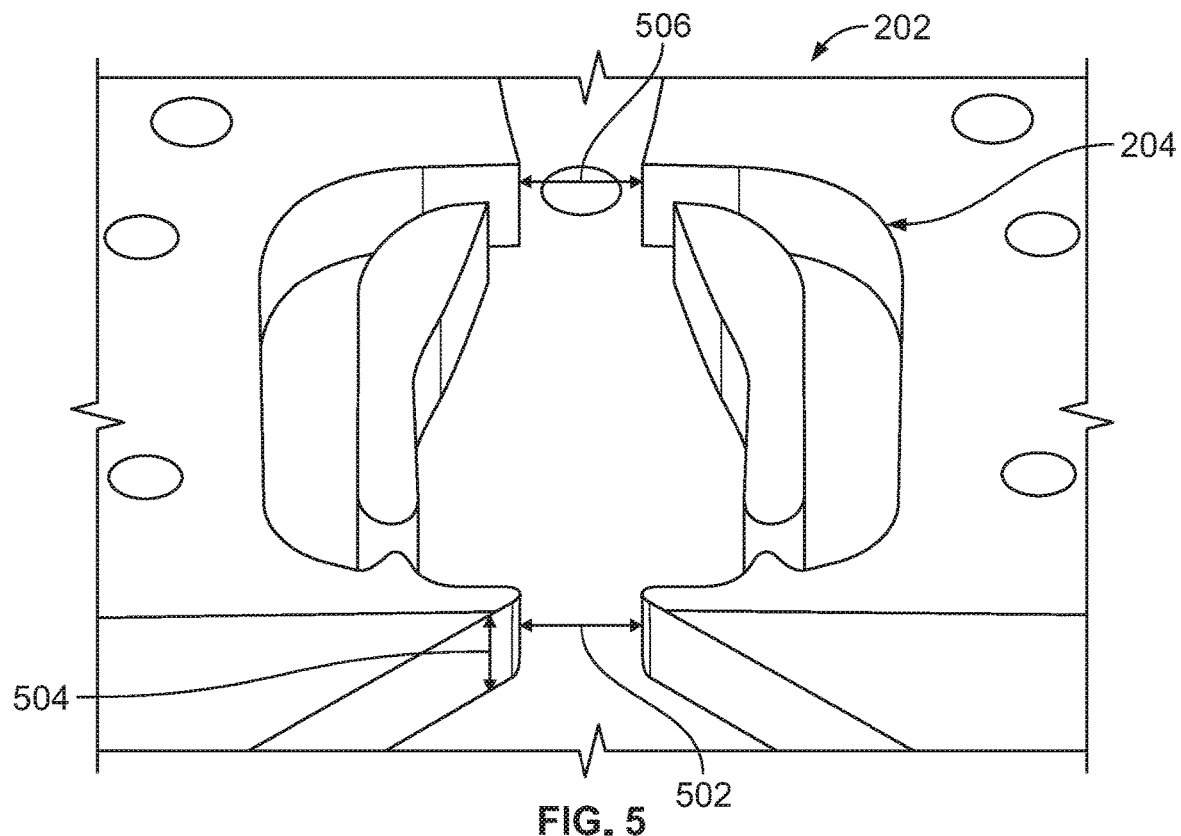
FIG. 5 illustrates example aspect ratios of the body of FIGS. 2A-4.

FIG. 5 illustrates example aspect ratios of the body 202 of FIGS. 2A-4. In the illustrated view of FIG. 5, a width 502 and a height 504 are shown. Further, a throat opening width 506 is shown. The throat opening width 506 may be 4-6 mm, for example. In this example, an aspect ratio is defined as a quotient of the width 502 divided by the height 504. This aspect ratio affects characteristic(s) of the resultant sweeping fluid jet and is varied by movement of the example plunger 210 (not shown) into/out of the cavity 204. However, any appropriate aspect ratio can be used instead.

Figure 6:
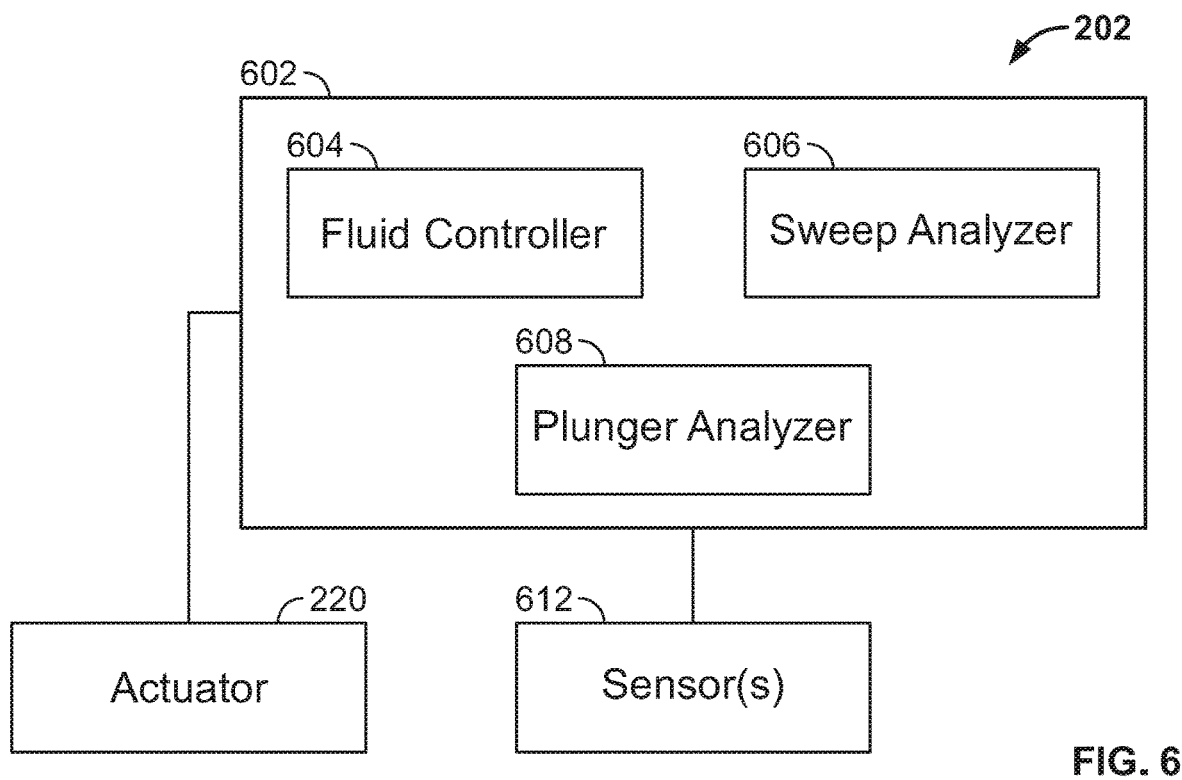
FIG. 6 is a schematic overview of an example oscillator control system that can be implemented in examples disclosed herein.

FIG. 6 is a schematic overview of an example oscillator control system 600 that can be implemented in examples disclosed herein. The oscillator control system 600 includes a fluid analyzer 602, which can be implemented in the fluidic controller 222 shown in FIG. 2A. Further, the fluid analyzer 602 is communicatively coupled to the actuator 220. The fluid analyzer 602 of the illustrated example includes a fluid controller 604, a sweep analyzer 606 and a plunger analyzer 608. In some examples, the fluid analyzer 602 is communicatively coupled to at least one sensor (e.g., a flow rate sensor, an optical sensor, a pressure sensor, etc.) 612.

The fluid controller 604 of the illustrated example determines a desired characteristic and/or parameter of a sweeping fluid jet exiting the oscillator 200. In some examples, the fluid controller 604 calculates an aspect ratio of the oscillator 200 corresponding to a desired heat transfer, fluid flow properties, fluid pressure and/or a sweep range period. Additionally or alternatively, the fluid controller 604 controls and/or regulates a fluid flow rate (e.g., a mass flow rate) of fluid entering the oscillator 200 at the inlet 302.

The example sweep analyzer 606 determines and/or analyzes desired sweep characteristics of the fluid exiting the outlet 304. For example, the sweep analyzer 606 may determine a desired angular range (e.g., a sweep range) and/or timing (e.g., a period of an angular cycle) of the fluid exiting the outlet 304 based on the desired characteristic and/or the parameter.

In the illustrated example, the plunger analyzer 608 calculates and/or determines a movement of the plunger 210 based on the aforementioned aspect ratio of the oscillator 200. In this example, the plunger analyzer 608 determines a movement of the plunger 210 to adjust the oscillator 200 to the aspect ratio.

While an example manner of implementing the oscillator control system 600 of FIG. 6 is illustrated in FIG. 6, one or more of the elements, processes and/or devices illustrated in FIG. 6 may be combined, divided, re-arranged, omitted, eliminated and/or implemented in any other way. Further, the example fluid controller 604, the example sweep analyzer 606 and the example plunger analyzer 608 and/or, more generally, the example oscillator control system 600 of FIG. 6 may be implemented by hardware, software, firmware and/or any combination of hardware, software and/or firmware. Thus, for example, any of the example fluid controller 604, the example sweep analyzer 606, the example plunger analyzer 608 and/or, more generally, the example oscillator control system 600 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, fluid controller 604, the example sweep analyzer 606, and/or the example plunger analyzer 608 is/are hereby expressly defined to include a non-transitory computer readable storage device or storage disk such as a memory, a digital versatile disk (DVD), a compact disk (CD), a Blu-ray disk, etc. including the software and/or firmware. Further still, the example oscillator control system 600 of FIG. 6 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
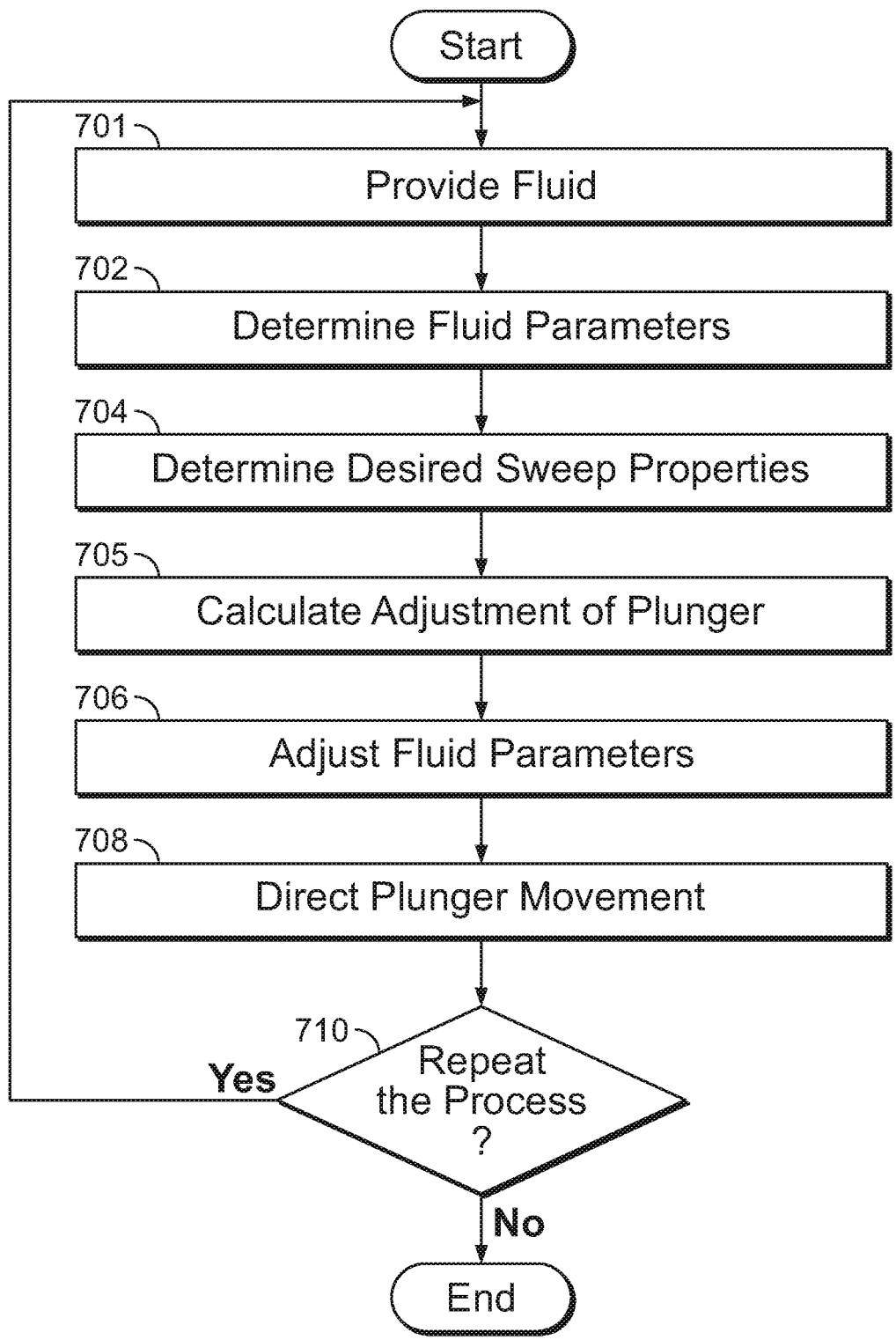
FIG. 7 is a flowchart representative of machine readable instructions which may be executed to implement the example oscillator control system of FIG. 6.

A flowchart representative of example hardware logic, machine readable instructions, hardware implemented state machines, and/or any combination thereof for implementing the oscillator control system 600 of FIG. 6 is shown in FIG. 7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example oscillator control system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIG. 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 700 of FIG. 7 begins as the oscillator 200 is being operated but will be adjusted to desired output characteristics. In particular, fluid is being provided to the oscillator 200 to generate a sweeping fluid jet prior to the oscillator 200 being adjusted. In this example, an aspect ratio of the oscillator 200 is being controlled to vary exiting flow properties.

At block 701, fluid is provided to the inlet 302. In this example, a pressurized fluid source and/or pump provides the fluid to the inlet 302. In some examples, the mass flow rate of the fluid maintained at a relatively constant level.

At block 702, the fluid controller 604 determines fluid parameters associated with fluid exiting the oscillator 200. For example, the fluid parameters may be associated with a desired fluid mixing (e.g., engine mixing, etc.), heat transfer, active air flow control and/or a flow jet movement. The fluid controller 604 may make this determination based on sensor data from the sensor(s) 612.

At block 704, the sweep analyzer 606 determines desired sweep properties and/or a corresponding desired aspect ratio of the oscillator 200. For example, the sweep analyzer 606 determines a desired period, a flow jet width and/or a sweep angle of the exiting fluid based on the fluid parameters determined by the fluid controller 604.

At block 705, the plunger analyzer 608 and/or the sweep analyzer 606 determines an adjustment of the plunger 210. In this example, an aspect ratio and, thus, a movement of the plunger 210 is calculated based on the desired sweep properties and/or the fluid parameters.

In some other examples, at block 706, the fluid controller 604 adjusts parameters of fluid entering the inlet 302. For example, the fluid controller 604 varies a flow rate, a pressure and/or a temperature of the fluid entering the inlet 302.

At block 708, the plunger analyzer 608 of the illustrated example directs movement of the plunger 210 to vary the aspect ratio of the oscillator 200. In this example, the plunger analyzer 608 causes movement of the plunger 210 relative to the cavity 204 based on the desired sweep properties.

At block 710, it is determined whether to repeat the process. If the process is to be repeated, control of the process returns to block 701. Otherwise, the process ends. This determination may be based on whether the exiting fluid properties are within a threshold range and/or are above/lower relative to a threshold value.

Figure 8:
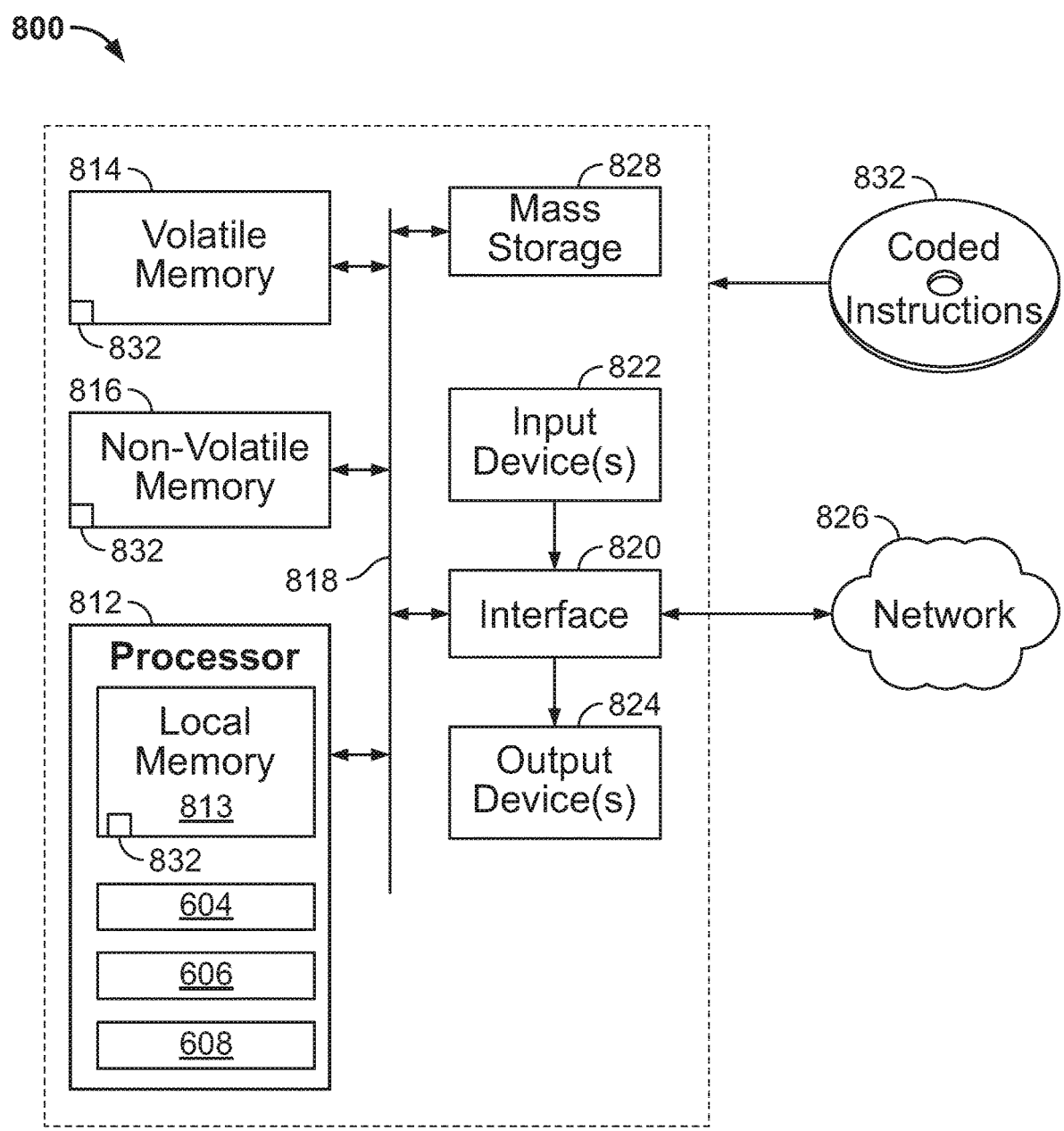
FIG. 8 is a block diagram of an example processing platform structured to execute the instructions of FIG. 7 to implement the example oscillator control system of FIG. 6.

FIG. 8 is a block diagram of an example processor platform 800 structured to execute the instructions of FIG. 7 to implement the example oscillator control system 600 of FIG. 6. The processor platform 800 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements fluid controller 604, the example sweep analyzer 606 and the example plunger analyzer 608.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 7 may be stored in the mass storage device 828, in the volatile memory 814, in the non-volatile memory 816, and/or on a removable non-transitory computer readable storage medium such as a CD or DVD.

FIGS. 9A-9J illustrate oscillator geometries that can be implemented in examples disclosed herein. In particular, the geometries of FIGS. 9A-9J represent cross-sectional profiles and/or oscillatory chambers that can be implemented in examples disclosed herein. Any of these geometries can be implemented in conjunction with examples disclosed herein and/or in combination with one another.

Figure 9B:
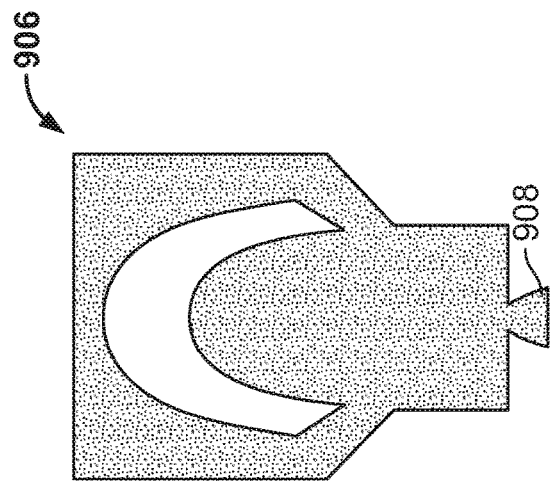
FIGS. 9A-9J illustrate oscillator geometries that can be implemented in examples disclosed herein.
Figure 9D:
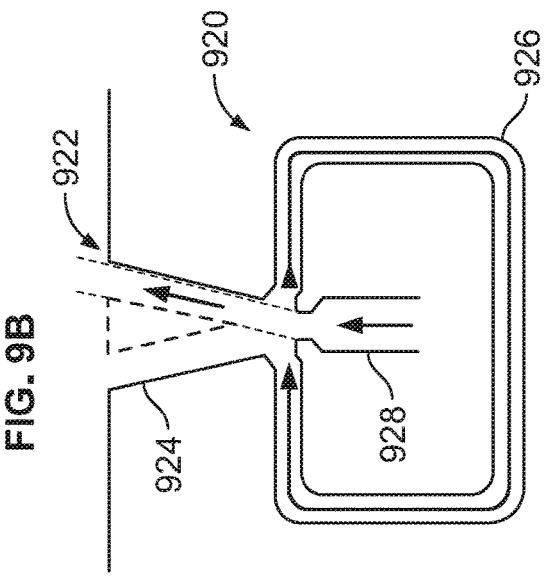
Figure 9A:
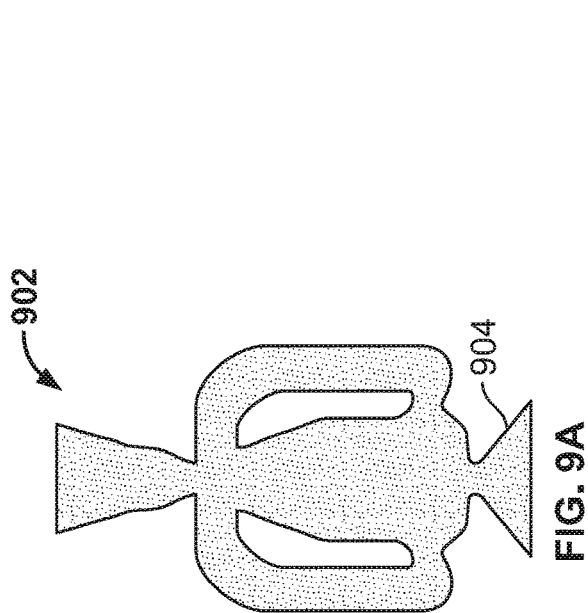

FIG. 9A depicts an example oscillator geometry 902 similar to the example oscillator 200. The oscillator geometry 902 includes an outlet 904.

FIG. 9B depicts an example oscillator geometry 906 with an outlet 908.

Figure 9C:
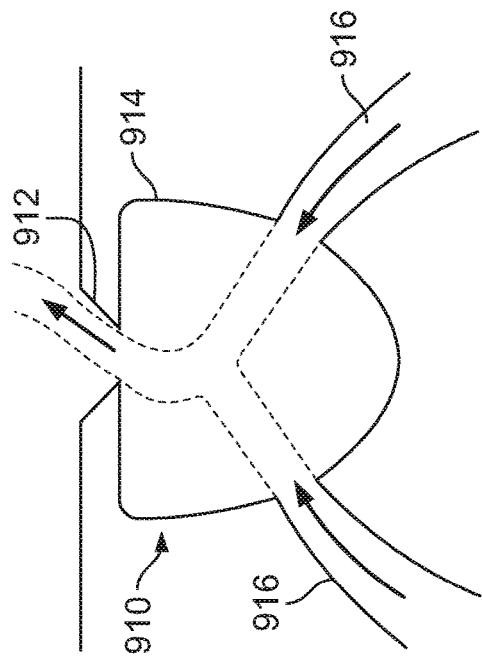

FIG. 9C depicts an example oscillator geometry 910 with an outlet 912. The example oscillator geometry 910 includes a chamber 914, which resembles a rounded cone, and inlet tubes 916 fluidly coupled to the aforementioned chamber 914.

FIG. 9D depicts an example oscillator geometry 920 with an outlet 922. The example oscillator geometry 920 includes outlet branches 924 of the outlet 922, a loop tube 926, and at least one converging inlet branch 928.

Figure 9E:
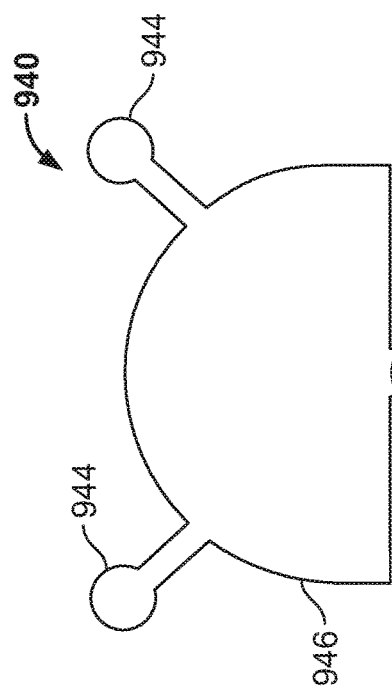

FIG. 9E depicts an example oscillator geometry 930 with an outlet 932. The oscillator geometry 930 is similar to the oscillator geometry 902, but, instead, includes kinked tubes 934. Further, an inlet 936 is shown in the illustrated example of FIG. 9E.

Figure 9F:
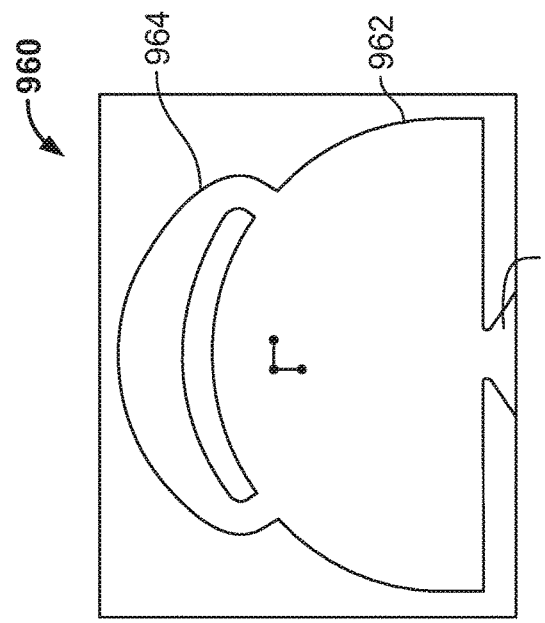

FIG. 9F depicts an example oscillator geometry 940 with an outlet 942. In this example, inlet nodes 944 are fluidly coupled to a semispherical chamber 946 in this example.

Figure 9G:
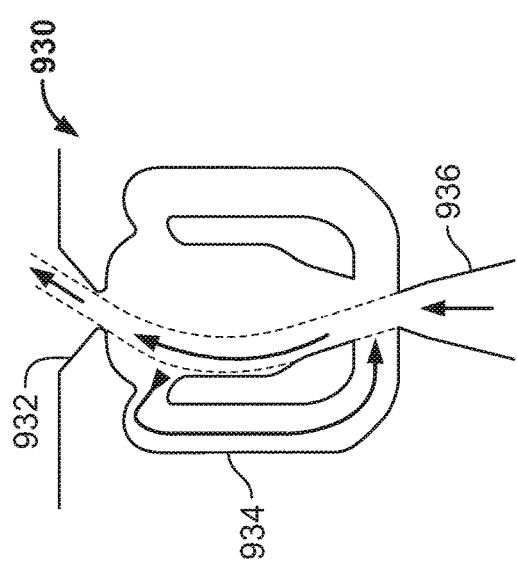

FIG. 9G depicts an example oscillator geometry 950 with an outlet 952. In the illustrated example, inlet nodes 954 are fluidly coupled to a rectangular chamber 956 in this example. In contrast to the chamber 946 of FIG. 9F, the chamber 956 exhibits relatively straight portions and/or walls.

Figure 9H:
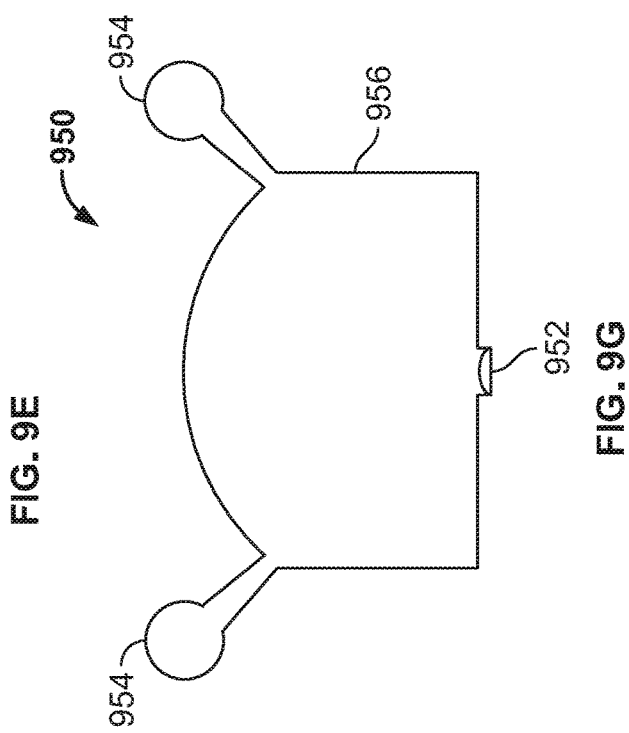

FIG. 9H depicts an example oscillator geometry 960 with an outlet 962. In this example, a first semispherical cavity 964 is fluidly coupled to a second semispherical chamber 966.

Figure 9J:
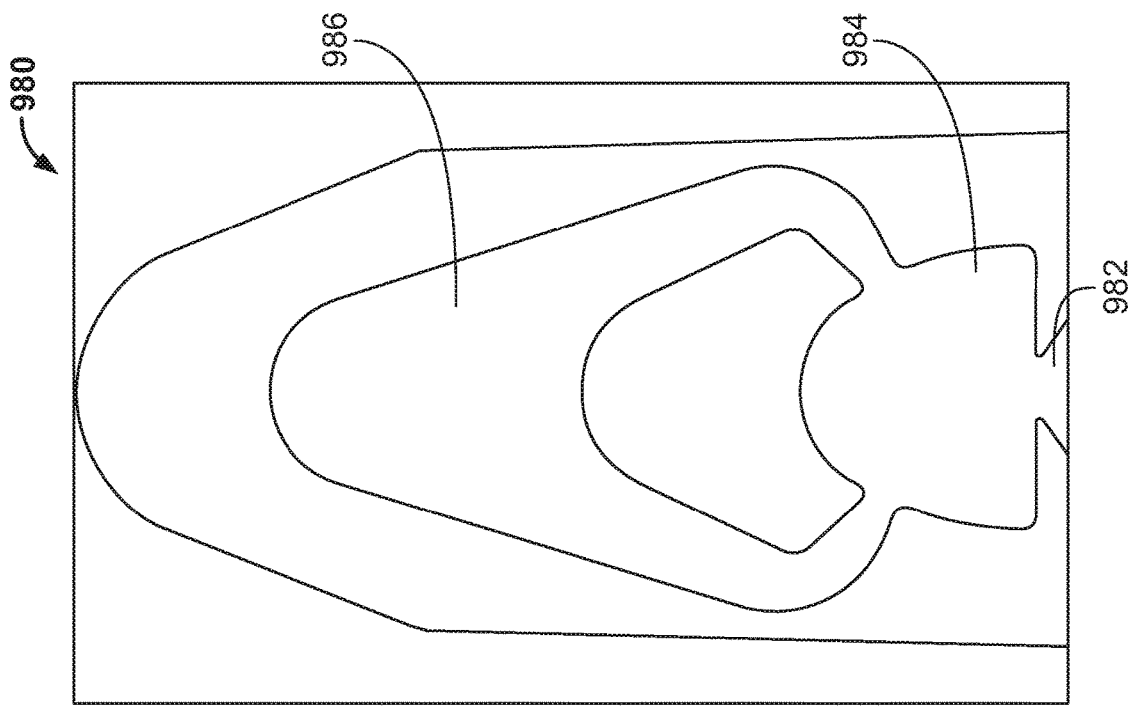
Figure 9I:
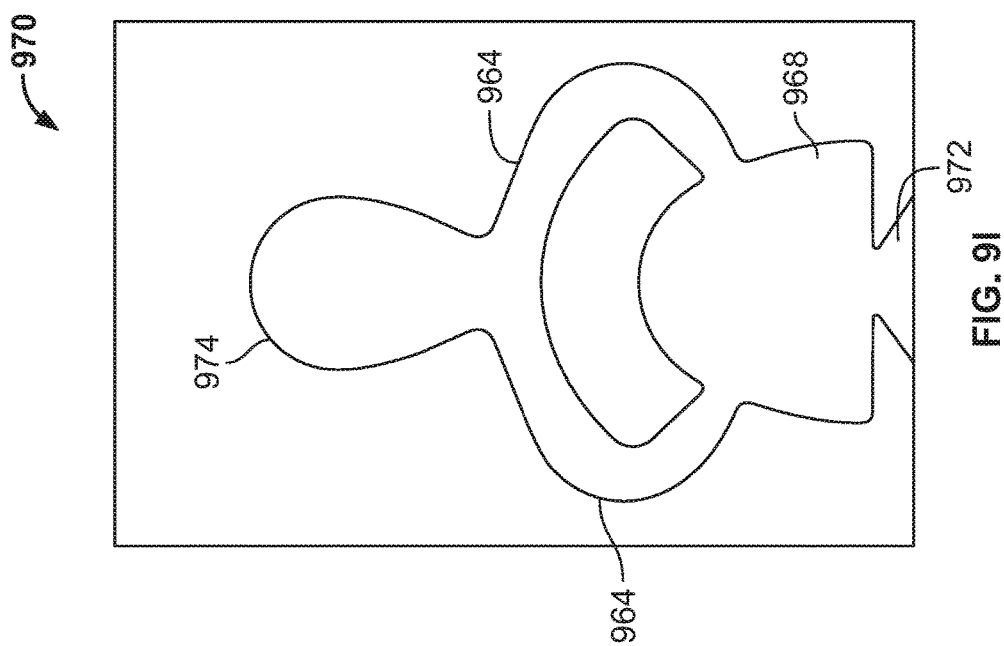

FIG. 9I depicts an example oscillator geometry 970 with an outlet 972. The oscillator 970 includes a first chamber (e.g., a distal chamber) 974 fluidly coupled to connection tubes 976 which, in turn, are fluidly coupled to a second chamber (e.g., an outlet chamber, a proximate chamber) 978.

FIG. 9J depicts an example oscillator geometry 980 with an outlet 982. The example oscillator geometry 980 includes a chamber 984 and a cone-like oblong converging chamber 986 fluidly coupled to the aforementioned chamber 984.

Figure 10:
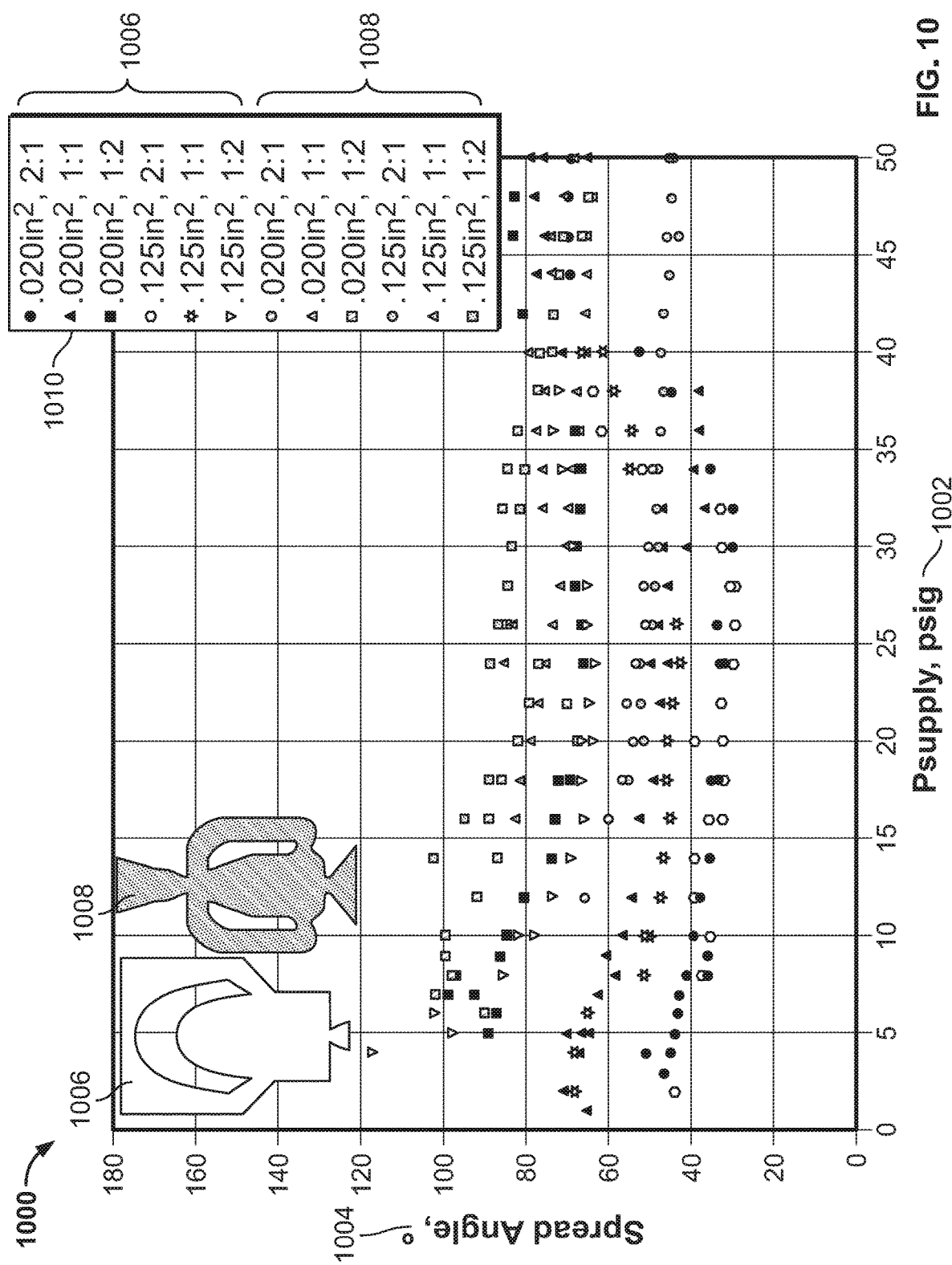
FIG. 10 is a graph illustrating example results associated with examples disclosed herein.

FIG. 10 is a graph 1000 illustrating example results associated with examples disclosed herein. In particular, the graph 1000 includes an axis 1002 pertaining to pressure and an axis 1004 associated with a resultant fluid spread angle. The oscillator shapes 1006, 1008 correspond to two different oscillator cross-sectional profiles while a legend 1010 represents outlet opening cross-sectional areas with corresponding varying aspect ratios. In the example graph 1000, a wide range of pressures and spread angles can be seen corresponding to the oscillator shapes 1006, 1008. In other words, without an aspect ratio adjustment of oscillators, only flow parameters (e.g., fluid flow rates, etc.) can be adjusted to vary a jet spread angle. However, adjustment of the flow parameters can adversely affect fluid operation and/or effectiveness thereof. In contrast, adjustment of the aspect ratio, as in examples disclosed herein, enables independent adjustment of the jet spread angle and, thus, a relatively large controlled operational variation of the oscillators.

Example 1 includes an oscillator. The oscillator includes a base having a cavity with a cross-sectional profile, where the cross-sectional profile defines an oscillatory chamber between an inlet and an outlet of the oscillator, and a plunger to be received by the cavity and movable along a depth of the cavity to vary an aspect ratio of the oscillator.

Example 2 includes the oscillator as defined in example 1, further including an actuator to move the plunger.

Example 3 includes the oscillator as defined in example 2, further including a controller to control the actuator based on sensor data measured by a sensor.

Example 4 includes the oscillator as defined in example 3, where the sensor includes a flow sensor.

Example 5 includes the oscillator as defined in any of examples 1 to 4, further including a seal of the plunger to sealingly engage the cavity.

Example 6 includes the oscillator as defined in any of examples 1 to 6, where the inlet is positioned on a lower surface of the base.

Example 7 includes the oscillator as defined in any of examples 1 to 6, further including a seal of the cavity to engage the plunger.

Example 8 includes an oscillator base. The oscillator base includes a body extending along a longitudinal axis of the oscillator base, where the body includes opposing front and rear surfaces arranged across the longitudinal axis, and where the body includes upper and lower surfaces extending between the front and rear surfaces. The oscillator base also includes a cavity with a cross-sectional profile at least partially defining an oscillatory chamber, where the cavity has an inlet at the lower surface of the body, and where the cavity is to receive a plunger to vary an aspect ratio of an oscillator associated with the oscillator base.

Example 9 includes the oscillator base as defined in example 8, further including a seal of the cavity to sealingly engage the plunger.

Example 10 includes the oscillator base as defined in any of examples 8 or 9, where the opening is circular.

Example 11 includes the oscillator base as defined in any of examples 8 to 10, further including a diverging outlet.

Example 12 includes the oscillator base as defined in example 11, further including a converging throat inlet.

Example 13 includes a method of varying an aspect ratio of an oscillator, the method comprising providing fluid to an inlet of a body of the oscillator, the fluid to exit the body at an outlet of the body as a sweeping fluid jet, and moving a plunger relative to a cavity of the body to vary the aspect ratio, the cavity defining an oscillatory chamber.

Example 14 includes the method as defined in example 13, further including determining, by instructions executed with at least one processor, a desired operational parameter of the fluid exiting the oscillator.

Example 15 includes the method as defined in example 14, further including calculating, by instructions executed with the at least one processor, the aspect ratio based on the desired operational parameter.

Example 16 includes the method as defined in example 15, where the aspect ratio is determined at least partially based on sensor data.

Example 17 includes the method as defined in any of examples 15 or 16, further including calculating, by executing instructions with the at least one processor, an adjustment of the plunger based on the aspect ratio.

Example 18 includes a non-transitory machine readable medium comprising instructions, which when executed, cause a processor to at least determine a desired fluid property of a fluid jet exiting an outlet of a body of an oscillator, calculate, based on the desired fluid property, an adjustment of a plunger, and move the plunger relative to a depth of a cavity of the body to vary an aspect ratio of the oscillator.

Example 19 includes the non-transitory machine readable medium as defined in example 18, where the instructions cause the processor to calculate the aspect ratio based on the desired fluid property.

Example 20 includes the non-transitory machine readable medium as defined in example 19, where the aspect ratio is calculated at least partially based on sensor data.

From the foregoing, it will be appreciated that example methods, apparatus and articles of manufacture have been disclosed that enable highly adjustable fluidic oscillators. Examples disclosed enable effective control of the fluid oscillators by varying an aspect ratio thereof. Examples disclosed herein can be used for flow control, generating sweeping fluid flows, mixing and/or heat transfer applications.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An oscillator comprising:
a base having a cavity with a cross-sectional profile, the cross-sectional profile defining an oscillatory chamber between an inlet and an outlet of the oscillator; and
a plunger to be received by the cavity and movable along a depth of the cavity to vary an aspect ratio of the oscillator.

2. The oscillator as defined in claim 1, further including an actuator to move the plunger.

3. The oscillator as defined in claim 2, further including a controller to control the actuator based on sensor data measured by a sensor.

4. The oscillator as defined in claim 3, wherein the sensor includes a flow sensor.

5. The oscillator as defined in claim 1, further including a seal of the plunger to sealingly engage the cavity.

6. The oscillator as defined in claim 1, wherein the inlet is positioned on a lower surface of the base.

7. The oscillator as defined in claim 1, further including a seal of the cavity to engage the plunger.

8. An oscillator base comprising:
a body extending along a longitudinal axis of the oscillator base, the body including opposing front and rear surfaces arranged across the longitudinal axis, the body including upper and lower surfaces extending between the front and rear surfaces; and
a cavity with a cross-sectional profile at least partially defining an oscillatory chamber, the cavity having an inlet at the lower surface of the body, wherein the cavity is to receive a plunger to vary an aspect ratio of an oscillator associated with the oscillator base.

9. The oscillator base as defined in claim 8, further including a seal of the cavity to sealingly engage the plunger.

10. The oscillator base as defined in claim 8, wherein the opening is circular.

11. The oscillator base as defined in claim 8, further including a diverging outlet.

12. The oscillator base as defined in claim 11, further including a converging throat inlet.

13. A method of varying an aspect ratio of an oscillator, the method comprising:
providing fluid to an inlet of a body of the oscillator, the fluid to exit the body at an outlet of the body as a sweeping fluid jet; and
moving a plunger relative to a cavity of the body to vary the aspect ratio, the cavity defining an oscillatory chamber.

14. The method as defined in claim 13, further including determining, by instructions executed with at least one processor, a desired operational parameter of the fluid exiting the oscillator.

15. The method as defined in claim 14, further including calculating, by instructions executed with the at least one processor, the aspect ratio based on the desired operational parameter.

16. The method as defined in claim 15, wherein the aspect ratio is determined at least partially based on sensor data.

17. The method as defined in claim 15, further including calculating, by executing instructions with the at least one processor, an adjustment of the plunger based on the aspect ratio.

18. A non-transitory machine readable medium comprising instructions, which when executed, cause a processor to at least:
determine a desired fluid property of a fluid jet exiting an outlet of a body of an oscillator;
calculate, based on the desired fluid property, an adjustment of a plunger; and
move the plunger relative to a depth of a cavity of the body to vary an aspect ratio of the oscillator.

19. The non-transitory machine readable medium as defined in claim 18, wherein the instructions cause the processor to calculate the aspect ratio based on the desired fluid property.

20. The non-transitory machine readable medium as defined in claim 19, wherein the aspect ratio is calculated at least partially based on sensor data.

* * * * *